(12) United States Patent
Nedblake, Jr. et al.

(10) Patent No.: US 6,863,756 B2
(45) Date of Patent: *Mar. 8, 2005

(54) METHOD AND APPARATUS FOR ON-DEMAND PRODUCTION OF DIGITALLY IMAGED WEBS

(75) Inventors: Greydon W. Nedblake, Jr., Captiva, FL (US); Lawrence E. Johnson, Gladstone, MO (US); Jules P. Farkas, Laguna Beach, CA (US)

(73) Assignee: LaserSoft Management, L.L.C., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/460,713

(22) Filed: Jun. 12, 2003

(65) Prior Publication Data

US 2003/0210313 A1 Nov. 13, 2003

Related U.S. Application Data

(63) Continuation of application No. 09/852,531, filed on May 9, 2001, now Pat. No. 6,598,531.

(51) Int. Cl.[7] ............................................... B32B 31/20
(52) U.S. Cl. ...................... 156/64; 156/234; 156/248; 156/257; 156/267; 156/344
(58) Field of Search ........................ 156/64, 344, 584, 156/234, 248, 249, 257, 238, 267, 268, 269, 273.3, 275.7, 289, 285, 361, 362, 519, 521, 528, 524, 566, 567, 568, 378, 379

(56) References Cited

U.S. PATENT DOCUMENTS

| | | | |
|---|---|---|---|
| 4,475,969 A | * | 10/1984 | Reed ........................... 156/152 |
| 5,300,160 A | | 4/1994 | Wilson et al. |
| 5,405,482 A | | 4/1995 | Morrissette et al. |
| 5,624,520 A | * | 4/1997 | Nedblake et al. ............ 156/249 |
| 5,776,297 A | * | 7/1998 | Edwards et al. ............. 156/379 |
| 6,123,796 A | * | 9/2000 | Kathmann et al. ........... 156/249 |
| 6,450,227 B1 | | 9/2002 | Labardi |
| 6,620,275 B1 | * | 9/2003 | Avila et al. .................. 156/152 |

FOREIGN PATENT DOCUMENTS

| | | |
|---|---|---|
| DE | 003143098 A1 | 5/1983 |
| DE | 003152881 A1 | 7/1983 |
| JP | JE0051039 | 12/1972 |
| JP | 404201835 A | 7/1992 |
| JP | 405147636 A | 6/1993 |
| JP | 406092336 A | 4/1994 |
| JP | 406099961 A | 4/1994 |
| JP | 406227534 A | 8/1994 |
| JP | 411174630 A | 7/1999 |
| JP | 020000203547 A | 7/2000 |
| JP | 02001055212 A | 2/2001 |

* cited by examiner

*Primary Examiner*—Chris Fiorilla
*Assistant Examiner*—George Koch
(74) *Attorney, Agent, or Firm*—Hovey Williams LLP

(57) ABSTRACT

Improved web printing and handling apparatus (10, 84, 88) is provided which includes an improved digital printing assembly (12) having a bidrectionally rotatable impression drum (18) presenting an outer surface (20), as well as at least one digital print head (22) adjacent the drum outer surface. The overall apparatus (10, 84, 88) also has a downstream web cutting and handling assembly (14) with an adhesive applicator (32), laser cutter (40) and image collection assembly (44). In use, a web (16) traverses the drum (18) with essentially no relative movement between the web (16) and drum surface (20), and the print head(s) (22) are actuated to form individual images on the web (16). Thereafter, the printed web passes into and through the assembly (14) where adhesive is applied and the individual images are laser cut and collected using assembly (44).

11 Claims, 3 Drawing Sheets

METHOD AND APPARATUS FOR ON-DEMAND PRODUCTION OF DIGITALLY IMAGED WEBS

RELATED APPLICATION

This is a continuation of U.S. patent application Ser. No. 09/852,531, filed May 9, 2001 now U.S. Pat. No. 6,598,531.

BACKGROUND OF THE INVENTION

1. Field of the Invention

The present invention is broadly concerned with web printing and handling apparatus, and corresponding methods, wherein images are individually printed on a continuous web using a relatively large rotating impression drum and associated digital print heads; thereafter, the printed web passes through a downstream cutting and handling assembly where the individual printed images are laser cut and collected. More particularly, the invention is concerned with such apparatus and methods wherein use an improved drum/digital print head printing assembly which permits high speed, on-demand production of images for labels or the like, using relatively inexpensive, thin, lightweight webs.

2. Description of the Prior Art

Traditionally, pressure sensitive labels have been produced using more or less standard, multiple-tower web-fed printing apparatus followed by die cutting of the individual labels. In such operations, it has generally been necessary to releasably adhere the printed web to a carrier sheet so as to permit die cutting of the labels. Once the labels are cut, the matrix is removed from the carrier, leaving the labels spaced on the carrier sheet which was then formed into a roll. Carrier sheets of this type typically represent nearly one half of the material cost of label production. This is a tremendous waste of resources, and the spent carrier sheets also present an on-going trash disposal burden.

In response to these problems, it has been suggested in the past to employ laser cutting devices in lieu of traditional die cutting systems. Moreover, some laser cutting systems are "linerless" in that the use of carrier sheets is eliminated. For example, U.S. Pat. No. 5,681,412 describes a modem-day laser cutting label production system of this type.

While such laser systems are a significant advance in the art, some problems remain. For example, the upstream printing of label stock prior to laser cutting has not heretofore been seriously addressed in prior laser-based systems. That is, traditional printing methods, be they either web fed multiple-tower printers or even conventional digital printing equipment, it is usually necessary to employ relatively thick webs having sufficient mechanical strength to withstand the printing operation. Rollers or other devices used to pull the webs through these printing units impose significant stresses on the webs, and if the webs are too thin or otherwise insufficiently strong, the webs have a tendency to break. As a consequence, it has generally been necessary to employ web having a thickness of at least about 2 mils. These webs are relatively expensive, as compared with thinner webs of, e.g., 0.5 mil thickness.

SUMMARY OF THE INVENTION

The present invention overcomes the problems outlined above and provides improved web printing and handling apparatus especially (although not exclusively) suitable for label making. Broadly speaking, the web printing and handling apparatus of the invention includes a web printing assembly operable to print successive, individual images on a continuously moving web, including a rotatable impression drum presenting an outer surface and at least one (and usually plural) digital print head(s) adjacent the drum outer surface. A downstream web cutting and handling assembly including a laser cutter and a collection assembly for laser cut images also forms a part of the overall apparatus. Finally, a web guidance system operable to guide a continuous web around at least a portion of the drum surface and between the drum surface and print head(s) is provided, allowing printing of successive images on the web. In practice, with the apparatus of the invention use can be made of relatively thin, inexpensive webs. This stems from the fact that during printing, the linear speed of the web and the speed of the impression drum surface are closely matched so that there is essentially no relative movement between the impression drum surface and web. Consequently, the web is stabilized during printing and is not subjected to undue tension or other forces which would otherwise distort or break the web. By the same token, use of digital print heads and associated sensors permits very accurate registration printing so that high quality images can be produced on demand.

In preferred forms, the print head maybe inkjet or laser print head, or any other suitable digitally-controlled printing device. The impression drum is preferably rotatable in opposite directions as desired, so that either side of a web may be printed.

DETAILED DESCRIPTION OF THE PREFERRED EMBODIMENT

Figure 1:
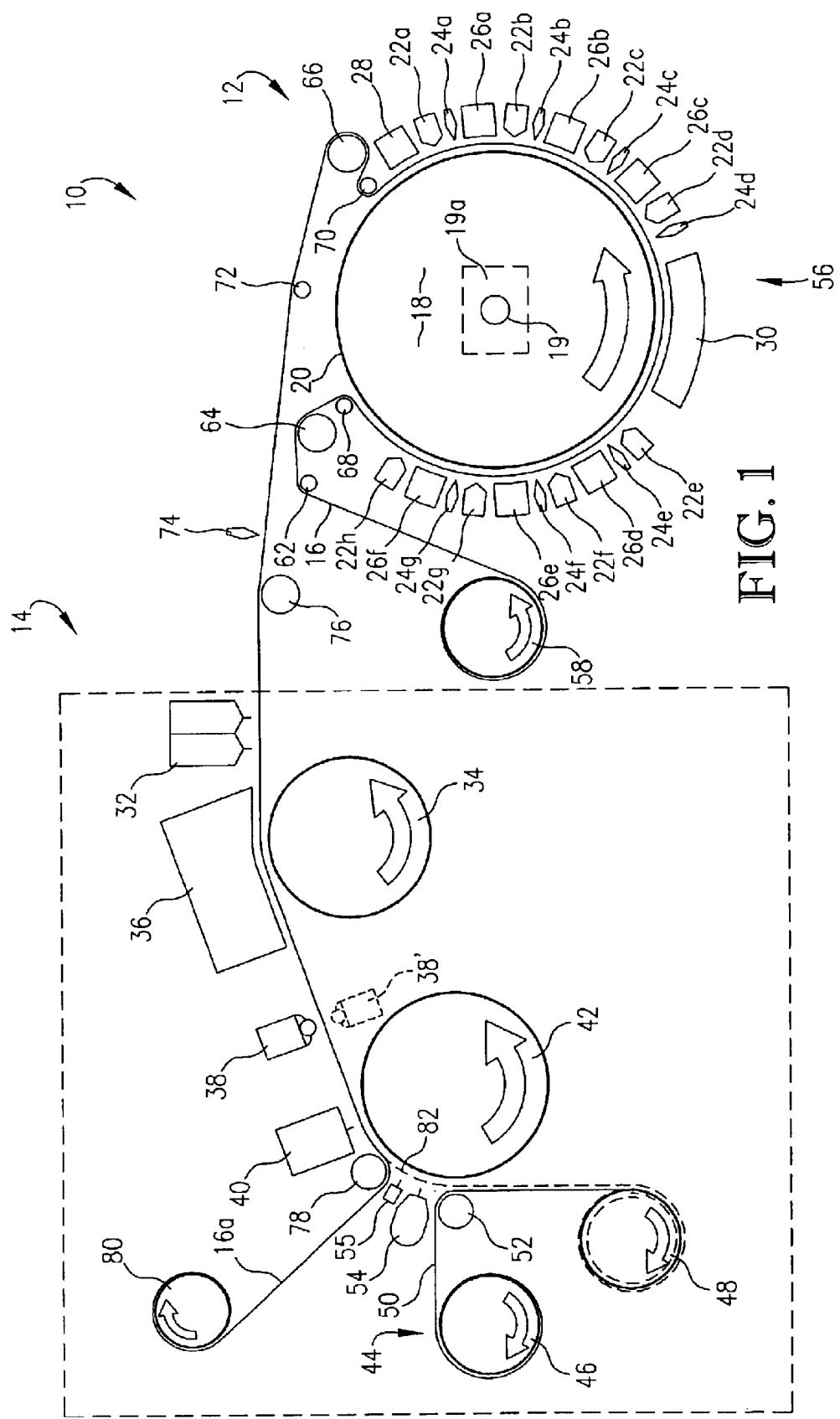
FIG. 1 is a schematic representation of the improved web printing and handling apparatus of the invention, particularly designed for the on-demand production of labels.

Turning now to the drawings, and particularly FIG. 1, a web printing and handling apparatus 10 is illustrated in a configuration especially adapted for the production of product labels. The apparatus 10 includes a printing assembly 12 and a downstream web cutting and handling assembly 14. The apparatus 10 is designed to accept a continuous web 16 and to print a succession of individual images (e.g., labels) on the web 16, followed by cutting and storage of the cut images. A feature of the invention is the use of a digital printing assembly and a relatively large impression drum, thereby permitting use of lightweight, thin, relatively low cost webs.

In more detail, the printing assembly 12 includes a relatively large (at least about 3 feet in diameter and more preferably from about 4–6 feet in diameter) impression drum 18 presenting an outer surface 20. The drum 18 is mounted for controlled rotation in either direction, i.e., clockwise or counterclockwise, by means of servo-driven gearless electronic drives (in this context "gearless" refers to the fact that the drum 18 does not have a peripheral gear as is common with typical gear train-driven drums). Thus (see FIG. 1), the drum 18 is rotatable on a central shaft 19 which is coupled with a servo-drive 19a. Furthermore, the drum is provided with internal passageways for cooling media such s chilled water or the like. The overall assembly 12 further includes at least one, and preferably a plurality of digital print heads 22. As shown in FIG. 1, a total of eight print heads 22a–22h are provided in circumferentially spaced relationship about and adjacent to surface 20 of drum 18. The print heads 22 can be any one of a number of digitally operated devices, such as inkjet, electrophotographic, ion deposition, electrographic, magnetophotographic, direct thermal, thermal transfer, digital, offset or laser printing heads. It will be appreciated that each such print head is individually driven and electronically controlled, which may include a servo-drive if needed.

In preferred practice, most of print heads 22 have an associated photosensor 24, in the case of FIG. 1, sensors 24a–24g. Similarly, the print heads have adjacent UV or EB (electron beam) curing devices 26, as shown in FIG. 1, the devices 26a–26f. Finally, it will be observed that additional UV/EB curing devices 28 and 30 are located about the periphery of drum 18.

The web cutting and handling assembly 14 includes a digitally operated adhesive application device 32, which can provide either sequential application of the adhesive or flood-coating as desired. A rotatable chill roller 34 is located downstream of device 32, and has an opposed UV/EB curing device 36. A scanning camera (typically a DDC camera) 38 is located downstream of the chill roller 34. Similarly, a conventional laser cutter 40 is disposed downstream of the roller 34 but on the opposite side of web 16. A vacuum and chill roller 42 is oriented downstream of the camera 38 and laser cutter 40.

The assembly 14 also includes a cut image collection assembly 44 adjacent roller 42. The assembly 44 has an unwind roller 46 and a takeup roller 48; a liner web 50 is supported between the rollers 46, 48, and is trained about an intermediate nip-forming roller 52 which forms a cut image transfer nip with roller 42 as shown. An optional EAS (electronic article surveillance) device 54 is positioned just upstream of the nip roller 52 and is operable to apply or print an RFID tag or other identifying indicia to cut labels. A sensor 55 associated with device 54 is employed to insure that the EAS tags are applied only to properly cut labels.

The overall printing assembly 12 further includes a web guidance system 56 which is operable to guide web 16 around at least a portion of drum surface 20 and between the latter and print head(s) 22 for printing of the outer face of web 16 with a succession of images; the system 56 also serves to guide the printed web into and through the assembly 14. In detail, the guidance system 56 includes a pair of alternate unwind rollers 58 and 60 (see FIG. 2), a support roller 62, and a pair of servo rollers 64, 66 located on opposite sides of the drum 18. An infeed nip roller 68 is positioned adjacent servo roller 64 and forms, with surface 20, an infeed nip with web 16. In like manner, an exit nip roller 70 is located adjacent servo 66, and forms with surface 20 an exit nip for web 16. In preferred practice, the system 56 also includes one or more additional support rollers 72, photosensor 74 and an additional, optionally usable, heatable laminating roller 76. Finally, the system 56 includes a matrix nip roller 78 adjacent and upstream of device 54, together with a matrix web takeup roller 80.

Although not shown in detail, it will be appreciated that the operation of apparatus 10 is microprocessor-controlled. That is, the sensors 24 and 74, camera 38, print heads 22, curing devices 24, 28 and 30, device 32, laser cuter 40 and the drum 18 and rollers 34 and 42 are all operatively coupled with microprocessor(s). Such microprocessor operation is controlled via known software, such as that commercialized by Wave Front Technologies of Irvine, Calif.

As indicated previously, the apparatus 10 illustrated in FIG. 1 is particularly suited for the production of labels. Accordingly, in the ensuing discussion, the operation of apparatus 10 for label production will be explained; it should be understood, however, that the apparatus 10 may be used in production of other printed articles if desired.

In the course of preparing labels using the apparatus 10, a starting web roll is mounted on unwind roller 58 and is threaded around rollers 62, 64 and 68, and about the surface 20 of drum 18. The web is further trained around rollers 70 and 66, and over rollers 72 and 76. Finally, the web is trained about nip roller 78 for ultimate takeup on matrix takeup roller 80. During printing and processing operation, the drum 18 is rotated at a predetermined speed and the web guidance 56 is operated to likewise move the web 16 around the drum 18 and through the remainder of the apparatus 10. In this connection, it is desired that the speed of drum surface 20 be essentially equal to the linear speed of the web 16, i.e., there is essentially no relative movement between the surface 20 and web 16 between the nip rollers 68, 70. This is insured through control of the rotational speed of drum 18, and control of web speed via system 56. In the latter case, the servo-rollers 64, 66 provide on-the-go tension and speed control of the web 16.

As the web 16 traverses the web surface 20 between the nip rollers 68, 70, the print heads 22a–22h are operated to individually print label images onto the outer surface of the web. As will be readily understood, each of the heads can be designed for printing a respective color so that the final printed images may be multi-colored to any desired extent. The operation of the print heads is controlled via the sensors 24. In the usual practice, web 16 is provided with fiducials or other eye marks adjacent or associated with the image-bearing regions of the web, and these are sensed by the sensors 24 so as to insure proper registration between the printing performed by each of the printing heads. In order to provide the highest quality printing, the individual curing devices 26 and 28, 30 are also operated during rotation of drum 18. This serves to at least partially dry and cure images or parts thereof deposited by the respective digital print heads 22.

As the web 16 leaves drum 18, it has printed thereon the desired, spaced label images. The web then traverses the rollers 72, 76 with intermediate sensing by sensor 74. Next, the web enters assembly 14 and is adhesively coated by device 32. In this connection, a feature of the invention is the ability to print on a face of the web 16 and then apply adhesive over the printing. This serves to "bury" the image so as to produce a higher quality label. As indicated previously, device 32, under microprocessor control, can be used to apply adhesive only to regions of the label images, or alternately, the web surface may be flood-coated.

After application of adhesive, the web 16 proceeds through a station defined by chill roller 34 and opposed curing device 36. This serves to fully cure and dry the adhesive applied upstream by the device 32.

Next, the printed label images are scanned by camera 38 so as to insure that they are all of appropriate quality. All such approved images are next laser cut using the cutter 40. This produces a series of individual labels 82 which are picked up by the vacuum operation of roller 42 for conveyance to nip roller 52. At the same time, the uncut remainder of the web 16, in the form of a matrix 16a, is taken up by takeup roller 80.

The individual labels 82 carried by roller 42 proceed to the area of nip roller 52 where such labels are collected on the liner 50. In particular, it will be observed that the liner 50, proceeding from unwind roller 46, around nip roller 50 and onto takeup roller 48, is positioned so as to accept and collect the individual labels 82. As each label 82 comes to a point adjacent the nip defined by nip roller 52 and roller 42, the vacuum holding the respective label 82 to the surface of roller 42 is relieved, thereby allowing the label to be picked up by the liner 50. As a consequence, the liner 50, with the applied labels 82, is rolled up to form a salable label product.

In the event that one or more label images of inferior quality are detected by camera 38, the microprocessor controller signals laser cutter 40 to not cut such inferior label images. Therefore, such inferior images form a part of the matrix web 16a and are collected on takeup roller 80 along with the cut matrix. In this way, the apparatus 10 avoids collection of substantial labels on collection liner 50. Also, the sensor 55 comes into play with respect to such uncut labels, in order to prevent application of an EAS device thereon.

Figure 2:
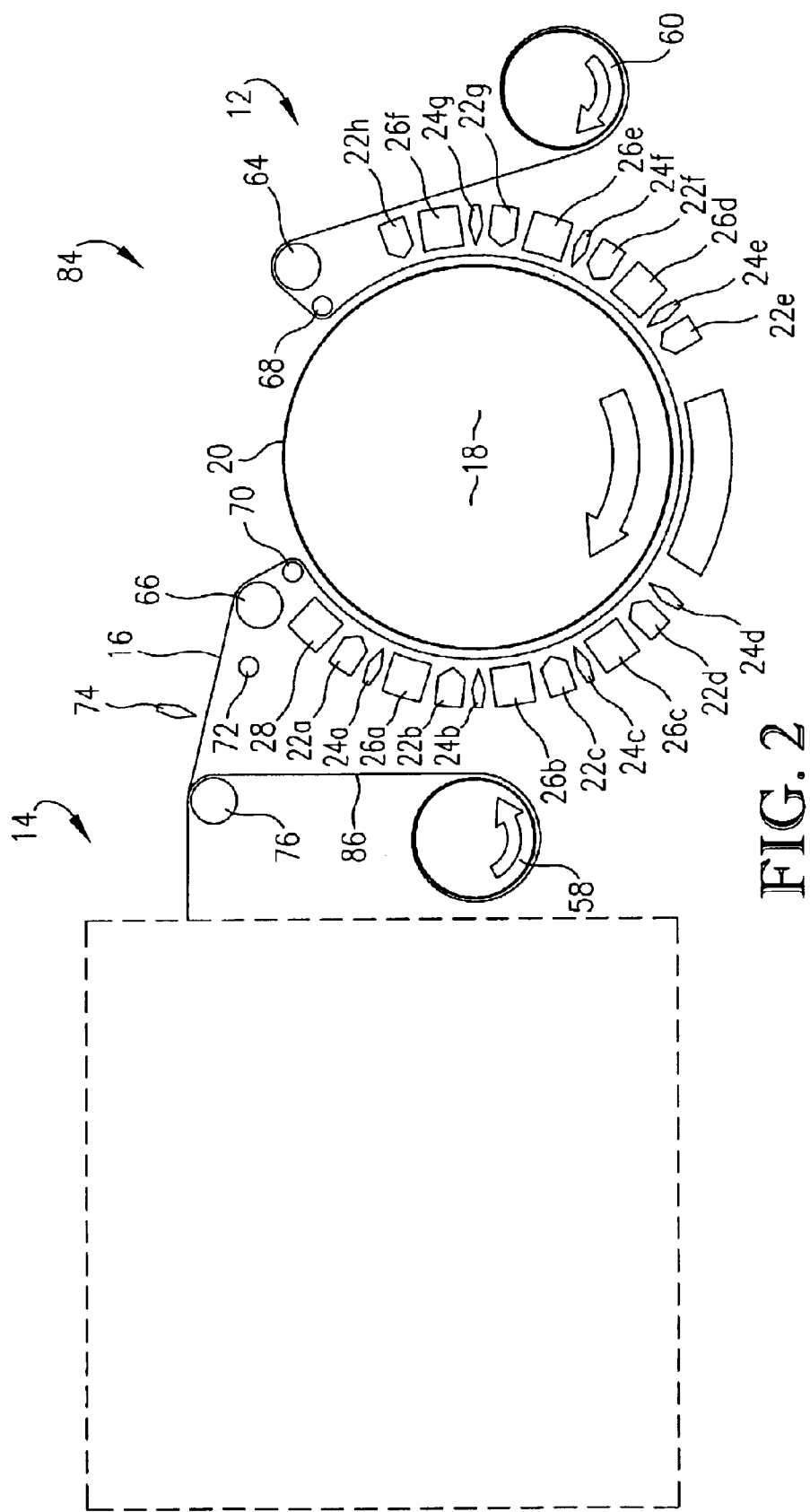
FIG. 2 is a view similar to that of FIG. 1, but illustrating the apparatus with reverse travel of the continuous web, as compared with FIG. 1.

FIG. 2 depicts an apparatus 84 very similar to apparatus 10 and including a printing assembly 12 and a web cutting and handling assembly 14. For ease of discussion, like components will be similarly numbered between FIGS. 1 and 2. In the FIG. 2 embodiment, the web 16 is mounted on alternate unwind roller 60 and thus proceeds in an opposite direction about surface 20 of drum 18 as compared with the FIG. 1 embodiment. By the same token, in the FIG. 2 embodiment, the drum 18 is rotated in a clockwise direction, as compared with the counter-clockwise direction of FIG. 1. Use of the alternate unwind roller 60 allows the opposite side of web 16 to be printed, as compared with the FIG. 1 embodiment. Also as shown in FIG. 2, a laminating web 86 may be applied to the printed face of web 16 prior to entrance of the composite into the assembly 14. To this end, the web 86 is mounted on primary unwind roller 58 and is applied to web 16 by heating of laminating roller 76.

The operation of apparatus 84 proceeds in exactly the same fashion as that described with reference to FIG. 1, with the exception of the described reverse travel of web 16 and the application of laminating web 86 to the printed face of web 16.

Figure 3:
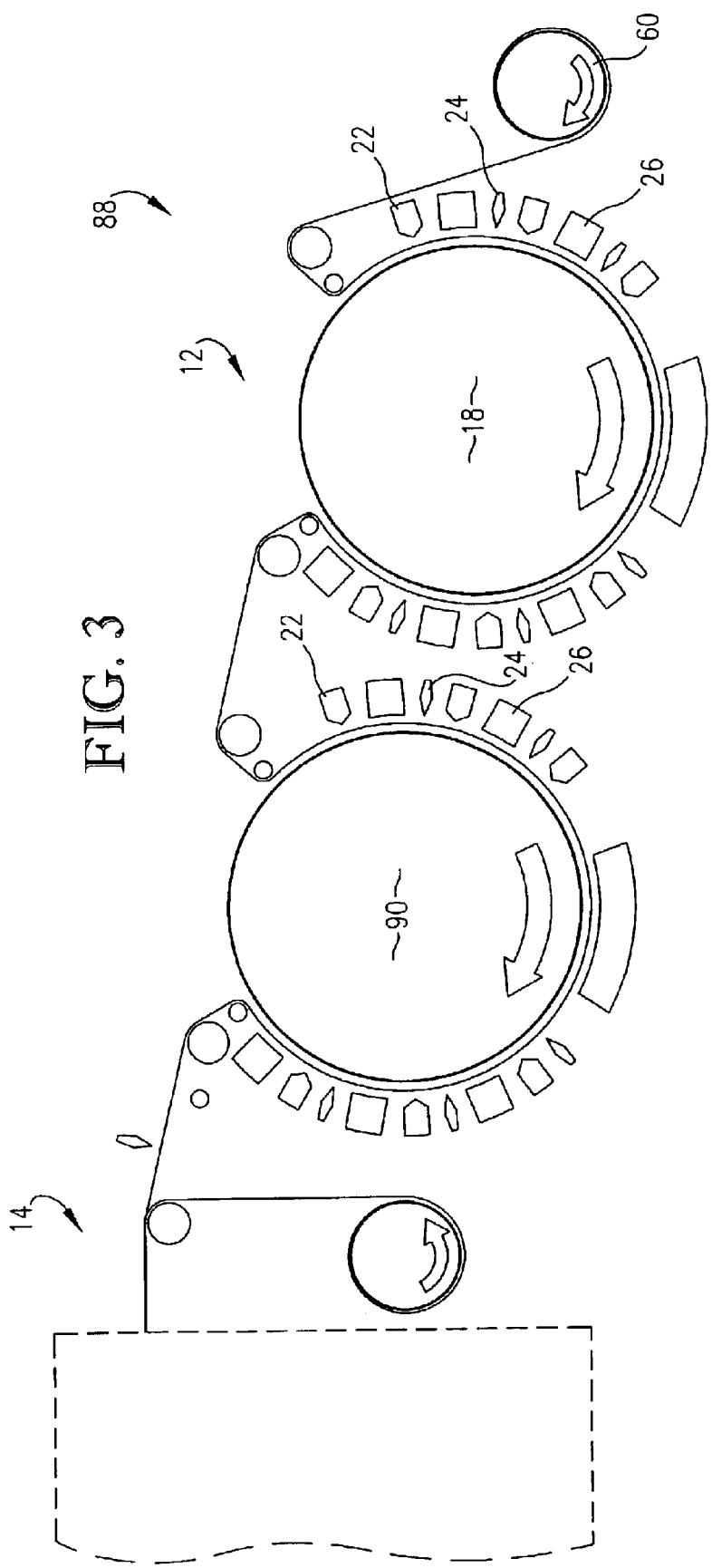
FIG. 3 is a schematic representation similar to that of FIG. 2, but depicting the use of a pair of serially related printing impression drums.

FIG. 3 illustrates a still further apparatus 88 in accordance with the invention, which is very similar to that shown in FIG. 2. However, in this case, an additional printing drum 90 with associated print heads 22, sensors 24, and UV/EB curing devices 26 is provided in the web path, prior to entrance of the web into the cutting and handling assembly 14. The purpose of the additional drum 90 and associated devices is to permit high speed operation through greater printing capacity. Also, the additional print heads allow further colors to be applied, as compared with use of only a single printing drum.

The apparatus and methods of the invention allow the user to produce high quality labels or other images using relatively low cost web material. That is, inasmuch as the web 16 is printed while traversing the drum 18 (and also drum 90 in the case of FIG. 3), the web is fully stabilized during the printing operation. This stems from the fact that the speed of the web 16, and that of the drum surface, are closely matched to essentially eliminate relative movement between the drum and web. This is to be contrasted with conventional systems wherein thicker, sturdier webs must be employed in order to avoid web breakage during printing or downstream handling. Furthermore, the use of microprocessor-controlled digital print heads allows production of very high quality printing, even at high speed, and with an on-demand feature.

The speed of the web is consistent with the speed of the drum 18 due to the web being in contact with the surface of the drum. Only a small amount of tension is applied to the web during travel thereof past the digital printing stations while the web is in contact with the drum. This is in contrast with conventional in-line systems where material with greater internal tensile values which increase thickness and/or cost, must be employed in order to avoid web breakage or elongation during web travel through the in-line printing and converting process. Furthermore, the use of microprocessor-controlled digital print heads allows for consisting high quality printing over a wide range of speeds.

While the foregoing embodiments depict the use of webs with adhesive application during processing, webs previously coated with a cured, activatable adhesive could also be employed, thus eliminating the need for in-line adhesive application.

We claim:

1. A method of handling a web having images printed thereon comprising the steps of:

providing an adhesive application device;

guiding said web past said adhesive application device and applying adhesive thereto;

curing said adhesive on said web;

scanning said images after said adhesive curing step to determine the quality of each individual image;

cutting said images from said web using a laser cutting device thereby producing a stream of labels and a waste matrix, said cutting step comprising selectively cutting said images from said web based on the result of said scanning step with any uncut images being taken up as a part of said waste matrix;

providing a label transfer assembly proximate said laser cutting device for receiving said labels; and transferring said labels onto a continuous liner.

2. The method of claim 1, said adhesive application step comprising sequentially applying adhesive over at least a portion of said images.

3. The method of claim 1, said curing step comprising guiding said web through a curing station defined by a chill roller and an opposed curing device.

4. The method of claim 3, said curing device selected from a member of the group consisting of UV and electron beam curing devices.

5. The method of claim 1, including the step of applying to said labels an identifying indicia.

6. The method of claim 5, said identifying indicia being an RFID tag.

7. The method of claim 1, said label transfer assembly comprising a vacuum roller.

8. A method of handling a web having images printed thereon comprising the steps of:

scanning said images to determine the quality of each individual image;

cutting said images from said web using a laser cutting device thereby producing a stream of labels and a waste matrix; and providing a label transfer assembly proximate said laser cutting device for receiving said labels, said image cutting step comprising selectively cutting said images from said web based on the result of said scanning step with any uncut images being taken up as a part of said waste matrix.

9. The method of claim 8, said method further including the step of transferring said labels onto a continuous liner.

10. The method of claim 8, said method further including the step of applying to said labels an identifying indicia.

11. The method of claim 10, said identifying indicia being an RFID tag.

* * * * *